United States Patent
Wathen

(10) Patent No.: US 6,443,661 B1
(45) Date of Patent: Sep. 3, 2002

(54) METHOD AND COMPOSITION FOR REDUCING DUST AND EROSION OF EARTH SURFACES

(76) Inventor: Boyd J. Wathen, 7045 W. 9600 North, Lehi, UT (US) 84043

( * ) Notice: Subject to any disclaimer, the term of this patent is extended or adjusted under 35 U.S.C. 154(b) by 0 days.

(21) Appl. No.: 09/693,671

(22) Filed: Oct. 20, 2000

(51) Int. Cl.⁷ ............................ C09K 17/00; E01C 21/00
(52) U.S. Cl. .................. 405/262; 405/263; 405/258.1; 405/302.6; 404/76; 106/244; 106/900; 252/88.1
(58) Field of Search ..................... 106/244, 900; 252/88.1; 405/258.1, 263, 264, 302.4, 302.6; 404/76

(56) References Cited

U.S. PATENT DOCUMENTS

| | | | |
|---|---|---|---|
| 3,005,790 A | | 10/1961 | Wynn et al. |
| 4,001,033 A | * | 1/1977 | Anthone et al. ............ 252/88.1 |
| 4,107,112 A | * | 8/1978 | Latta, Jr. et al. .............. 404/76 |
| 4,571,116 A | * | 2/1986 | Patil et al. .................... 404/76 |
| 4,663,067 A | * | 5/1987 | Mallow et al. ............ 252/88.1 |
| 4,735,658 A | | 4/1988 | Blet et al. |
| 5,595,782 A | * | 1/1997 | Cole ........................... 252/88.1 |
| 5,603,745 A | | 2/1997 | Pettersen et al. |
| 5,801,204 A | | 9/1998 | Johansson et al. |
| 5,968,222 A | | 10/1999 | Kodali |
| 6,065,903 A | * | 5/2000 | Doyle .......................... 405/264 |
| 6,149,351 A | * | 11/2000 | Doyle .......................... 405/264 |

* cited by examiner

*Primary Examiner*—Heather Shackelford
*Assistant Examiner*—Frederick L. Lagman
(74) *Attorney, Agent, or Firm*—Mallinckrodt & Mallinckrodt; Robert R. Mallinckrodt

(57) ABSTRACT

A treatment product for earth surfaces, particularly earth surfaces which generate dust such as dirt roads or parking lots, includes a fatty acid containing material and water in at least a temporary semi-emulsion state when applied to the earth surface. The fatty acid containing material may be used vegetable oil, animal renderings, or a combination thereof such as Yellow Grease. An emulsifying agent can be used to help emulsify the fatty acid material in the water. The fatty acid material makes up between about 10% to about 85% of the product with the water, and emulsifying agent, if used, making up the remainder. When used, the emulsifying agent can make up to about 1% of the amount of water used. The product is applied to the earth surface to be treated and dries in several hours.

17 Claims, 2 Drawing Sheets

METHOD AND COMPOSITION FOR REDUCING DUST AND EROSION OF EARTH SURFACES

BACKGROUND OF THE INVENTION

1. Field

Figure 1:
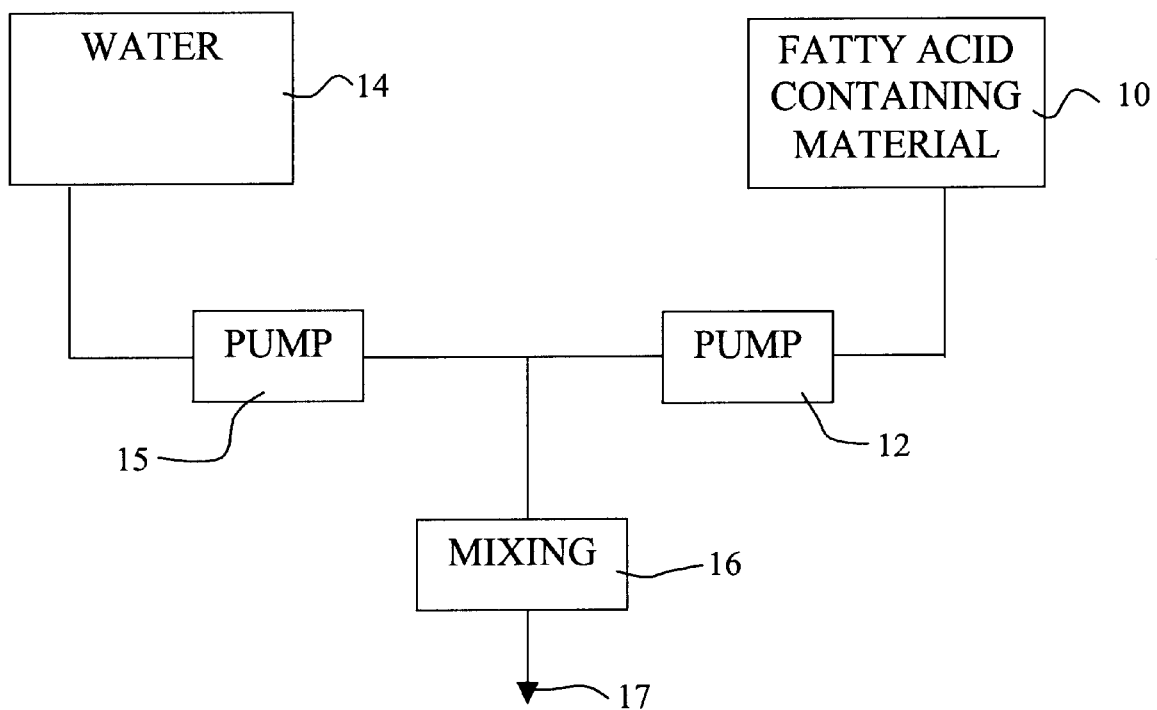

The invention is in the fields of methods and compositions for treating earth surfaces, such as dirt and gravel roads and parking lots, to reduce dust from and erosion of such surfaces.

2. State of the Art

Dust control on exposed earth surfaces is a continuing problem. Surfaces such as dirt roads and dirt parking lots generate substantial dust when driven over by a vehicle and can generate dust in windy weather condition. Erosion from vehicle use and from weather conditions, such as rain, snow, or wind, also are problems for such surfaces. Surfaces such as construction sites and tailing disposal sites have similar problems, particularly in windy conditions.

There are various prior art ways of dealing with the dust problems. One way is to spray water and is labor intensive as the surface has to be maintained in a damp condition and damp surfaces dry quickly in many areas.

In some instances, petroleum products, such as diesel fuel, have been used to spread on earth surfaces to reduce dust and erosion. However, such products have been found to cause contamination of water supplies so is now outlawed in most areas. Chemicals such as magnesium chloride, re-claimed asphaltic materials, resins, lignins, lignin sulfonates, lecithin and its derivatives, and various other materials have and are being used in various circumstances, but have associated problems of contamination, only short term effectiveness because it is washed away with rain or is worn away.

Vegetable oil has been tried but has similar problems to other prior art materials in that it is easily washed away by water so is effective after application only until the next rain.

SUMMARY OF THE INVENTION

According to the invention, it has been found that an emulsion or semi-emulsion of a fatty acid containing grease or oil, referred to herein as a fatty acid containing material, such as rendered grease and/or used vegetable oil, with water creates a long lasting and cost effective material to apply to earth surfaces to reduce dust from and erosion of such surfaces. It has been found that such product appears to bind to and penetrate into the top layer of earth forming the surface and binds the particles forming the surface and top layer together to form a dust resistant and water repellent, relatively hard surface that appears to last indefinitely.

The fatty acid containing material is mixed with water, with at least one of the ingredients, preferably the fatty acid containing material, at an elevated temperature, so that upon mixing, an emulsion or semi-emulsion product is formed. The product needs to remain in the emulsion or semi-emulsion state only until the product is applied to the surface to be treated. The mixing of the product can take place in advance of application and kept in a tank or drum, or can take place in a tank such as the tank of a truck which applies the material with a spray bar, or may be mixed as the ingredients are pumped together from separate tanks for application through a spray bar or nozzle. If desired, an emulsifying agent may be added. Such agent is generally mixed with the water prior to mixing with the fatty acid containing material. Use of the emulsifying agent appears to allow a lower fatty acid containing material to water ratio and more uniform spreading of the product on an earth surface.

The fatty acid containing material may come from various sources. Used vegetable oil may come from sources such as fast food outlets where it has been used for cooking food such as french fries or from industries such as potato chip or other snack food factories. The rendered grease will generally come from an animal rendering plant, and may be tallow or similar products. The presently preferred fatty acid containing material is a mixture of used vegetable oil and animal fat available from animal rendering plants and referred to as Yellow Grease. Most animal rendering plants collect used vegetable oil, mix it with animal fat to create the Yellow Grease which is used on or as animal feed. The fatty acid containing material may be mixed with water to comprise between about 10% to about 85% of the emulsified or semi-emulsified product, and preferably from about 20% to about 50% of the emulsified or semi-emulsified product. If an emulsifying agent is used, such agent may make up to about 1% of the emulsion or semi-emulsion. The fatty acid containing material is preferably heated prior to mixing with the water with a temperature between about 130° F. to about 215° F. being satisfactory. The water preferably is also heated, but may be used at ambient temperature.

The emulsion or semi-emulsion may be sprayed onto the surface or poured onto the surface and is absorbed into the surface where it has been found to bind surface particles to form a relatively hard surface thereby reducing dust and erosion of the surface.

THE DRAWINGS

Figure 2:
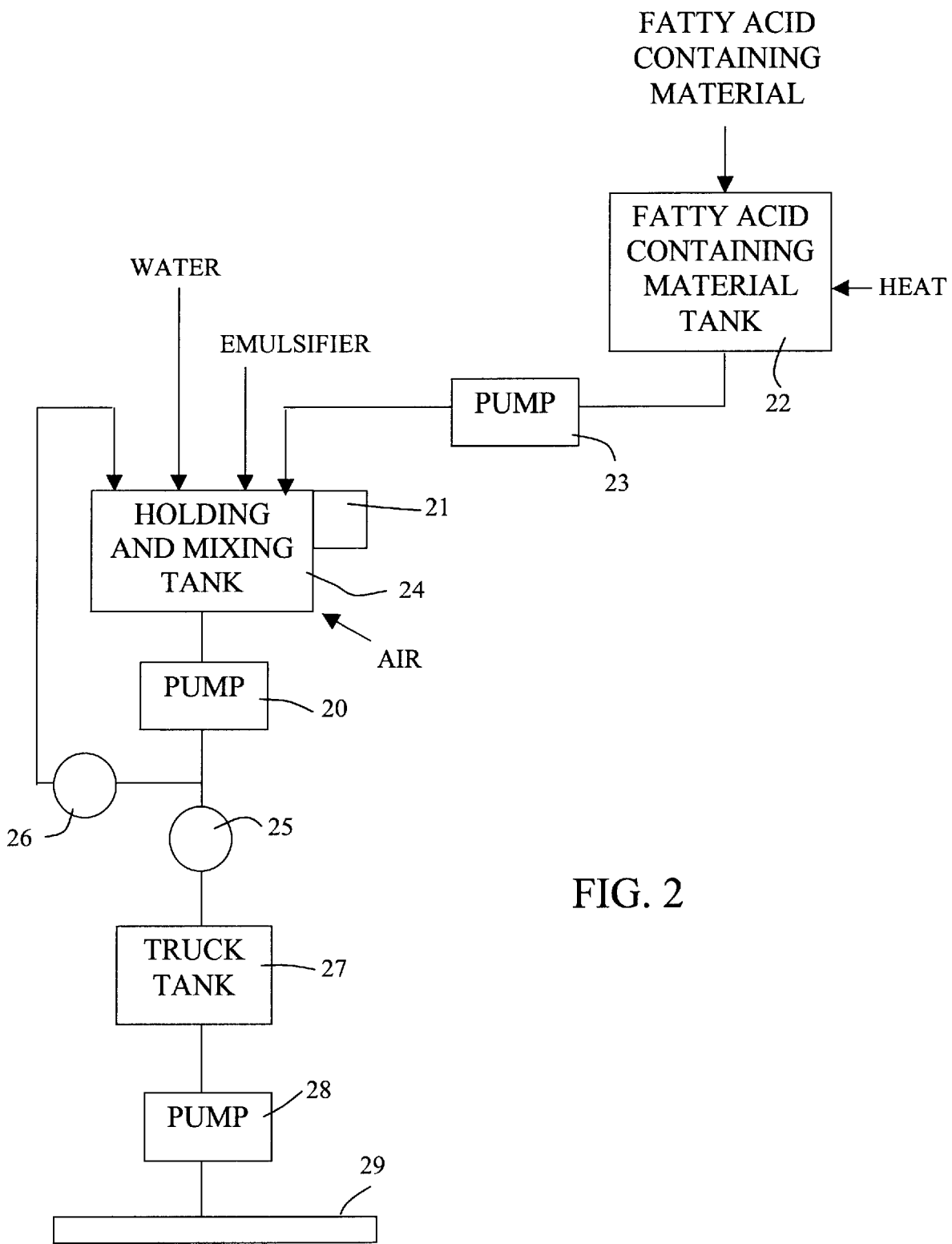

The best mode presently contemplated for carrying out the invention is illustrated in the accompanying drawings, in which:

FIG. 1 is a block diagram of a basic system for mixing and applying the product of the invention; and FIG. 2, a more detailed block diagram of a system used in mixing and applying the product of the invention.

DETAILED DESCRIPTION OF THE ILLUSTRATED EMBODIMENT

The invention is a product to be applied to an earth surface to reduce the dust from the earth surface and to reduce the erosion of the earth surface. The invention also includes the method of reducing the dust from and the erosion of an earth surface by applying the product of the invention to the earth surface.

The product is a combination, in an emulsion or semi-emulsion form, of a fatty acid containing material and water. An emulsifying agent can be added, if desired. The fatty acid containing material is a grease or oil which contains fatty acid. The grease or oil is nonpetroleum based and generally will be an animal grease or used vegetable oil. The grease generally will be a rendered animal product from an animal rendering plant such as tallow, or similar product. The oil will generally be used vegetable oil or similar product. Such used oil can be obtained from fast food outlets, restaurants, or some food manufacturing plants. Generally, animal rendering plants will collect used vegetable oil and mix it with animal grease to form a mixture of both vegetable oil and animal grease, generally referred to as Yellow Grease. While Yellow Grease can have various compositions, it has been found that all Yellow Greases and similar products experimented with by the inventor are satisfactory.

The fatty acid containing material will make up between about 10% to about 85% of the product, with a preferred range of 20% to 50%, with water making up the remaining amount. The fatty acid containing material should be heated to between about 130° F. and about 215° F. prior to mixing and the water may be used at ambient temperature or may also be heated. The necessity of heating of the water will depend upon the ambient temperature and the temperature of the fatty acid containing material.

The fatty acid containing material and water is mixed to form an emulsion or semi-emulsion which is the product of the invention. The mixing may be achieved in various ways. The fatty acid containing material and water may be pumped through a static in-line mixer, such as blades arranged in a pipe through which the fatty acid containing material and water flow, with the blades causing turbulence and mixing of the fatty acid containing material and water. While an in-line mixer will work, the mixed life of the product is best maintained by using an emulsion pump for mixing the product. Such pump may take the form of a centrifugal pump through which the fatty acid containing material and water is pumped. Generally, as shown in FIG. 1, the fatty acid containing material will be pumped from a tank or other storage vessel 10, preferable a heated vessel, into a mixing pipe 11 by pump 12. The water is pumped from a tank or other storage vessel 14 into the mixing pipe 11 by pump 15. Mixing to form the emulsion or semi-emulsion takes place in the mixing block 16. This can be an in-line mixer, an emulsion pump, or other mixing apparatus. Preferably, the mixing block 16 comprises a centrifugal pump which pumps the product through mixing pipe 11 to a discharge 17 which may be a spreader spray bar, nozzle, or storage vessel. The centrifugal pump mixes the fatty acid containing material and water to form the emulsion or semi-emulsion. Where the only mixing of the product is an in-line mixer through which the fatty acid containing material and water is pumped, or a single pump in the line, the product is generally spread immediately since the single mixing step usually will form only a temporary emulsion or semi-emulsion.

Where the product is to be stored in a storage vessel, such as a tank on a truck having a spray bar for spreading the product, rather than being spread immediately upon mixing, the fatty acid containing material and water will usually be mixed in a holding and mixing tank. The fatty acid containing material and water can be placed in the holding and mixing tank and may be mixed by a pump which recirculates the product in the tank. Some time for mixing resulting from the recirculation is required before the product is used to ensure that it has reached the form of the emulsion or semi-emulsion. Alternately, or in addition to recirculation, air can be introduced into the holding and mixing tank to bubble through the product and cause mixing to form the emulsion or semi-emulsion.

If desired, an emulsifying agent (emulsifier) can be used in the product. It is preferred that any emulsifying agent used be added to the water, such as in vessel 14, FIG. 1, and be allowed to hydrate before mixing with the fatty acid containing material. A water soluble anionic polymer sold under the designation polymer D-L by 3V Company of New Jersey has been found satisfactory. Usually the hydration of the emulsifying agent will take from 2 to 15 hours. The time involved will depend upon the temperature of the water, the higher the temperature the shorter the time, and on whether any mixing of the water and emulsifying agent takes place. Various mechanical mixing devices can be used such as stirrers, pumps, or air circulation. When hydrated, the water and emulsifying agent will have a viscosity similar to thick gravy. This water mixture is then mixed with the fatty acid containing material.

Use of the emulsifying agent aids in the formation of an emulsion of the fatty acid containing material and the water and a relatively stable, long lasting emulsion is formed. Further, it has been found that with the emulsifying agent, less fatty acid containing material can be used in the product because of better emulsification and better flow and spreading of the product on the surface.

FIG. 2 shows a more detailed block diagram of a system for making and spreading the product of the invention. The system of FIG. 2 mixes the fatty acid containing material and water to form the product, with the water preferably including an emulsifier, in a holding and mixing tank so the product can be stored before use and can be stored as it is transported to a site for application. Referring to FIG. 2, water and emulsifier are added to holding and mixing tank 20. The water and emulsifier remain in holding and mixing tank 20 until the emulsifier becomes hydrated. This can take anywhere from 2 to 15 hours depending upon the temperature of the solution and whether or not stirred or otherwise agitated. If desired, holding and mixing tank 20 can be heated. A mechanical stirrer 21 may be inserted into holding and mixing tank 20 for stirring the water-emulsifier solution. Also, air may be blown under pressure into the holding and mixing tank 20 to bubble through the water-emulsifier emulsifier solution for mixing.

When hydrated, fatty acid containing material is pumped from heated fatty acid containing material holding tank 22 by pump 23 into holding and mixing tank 20 and the water-emulsifier solution therein. Again, air may be blown under pressure into holding and mixing tank 20 to bubble through the product in the holding and mixing tank thereby agitating and mixing it. Rather than air, or in addition to the air, centrifugal pump 24, with valve 25 closed and valve 26 open, recirculates the product by pumping it from the tank in a loop back into the tank. The action of the centrifugal pump will mix and emulsify the product. After the desired mixing of the product to create an emulsion, valve 26 can be closed and valve 25 opened so the product is pumped to a truck mounted tank 27. The truck can then take the product to the surface to be treated. When reaching the surface to be treated, pump 28 pumps the product to truck mounted spray bar 29 which sprays the surface to be treated as the truck with truck mounted tank 27 travels over the surface to be treated. It has been found that once pumped into a truck tank, the product, which will be at an elevated temperature from the heating of the fatty acid containing material in holding tank 22, the product can remain in the truck for about 24 hours and still be flowable and suitable for use.

When applied to an earth surface, such as a road, vehicle travel on the road should be halted while the product is absorbed into the surface and dries. The absorption and drying usually takes about four hours, but depends upon the weather conditions when applied. The absorption of the product allows the bonding together of the particles making up the top layer and surface of the earth to which the product is applied. As the product dries, the surface treated becomes relatively hard and water repellant. This treated surface resists wear and erosion and creation of dust therefrom since the particles making up the surface are bonded together.

The inventor has tested the product and method by applying the product to several test surfaces. Some examples are detailed below.

EXAMPLE 1

A lightly used dirt driveway was treated experimentally with a product of the invention. The product contained 50% fatty acid containing material in the form of used vegetable oil, and 50% water. No emulsifying agent was used. The used vegetable oil and water were mixed in a five gallon container with both vegetable oil and water at 120° F. A semi-emulsion was formed by shaking the container. The product was immediately sprayed with a hand sprayer on the driveway surface. The driveway surface was allowed to dry and it was found that the surface appeared to be bonded together and became relatively hard and water resistant. Water runs off the surface similarly to an paved asphalt surface. Dust is not generated by vehicles traveling on the surface. The surface has lasted through one winter with rain and snow falling thereon and with freezing temperatures, and still appears to be intact and effective for dust and erosion control.

EXAMPLE 2

Approximately 1570 square feet forming a dirt truck entry area for a plant was experimentally treated with 120 gallons of the product. The product consisted of 33.33% fatty acid containing material in the form of Yellow Grease and 66.66% water containing 0.3% by weight of emulsifying agent in the form of polymer AL from 3V company. Eighty gallons of water were prepared in separate forty gallon barrels by adding 0.3% by weight of polymer D-L. The water was at a temperature of 120° F. and the water and emulsifying agent were mixed using a shaft mixer powered by a portable electric drill. A barrel of 40 gallons of Yellow Grease was heated to 130° F. The water-emulsifier was pumped into a static in-line mixer as was the liquid Yellow Grease by separate pumps for each. About twice as much water as Yellow Grease was pumped to the mixer giving the mixed product proportions of one-third Yellow Grease and two thirds water-emulsifier mixture. The mixed product from the mixer was discharged to a sprayer nozzle from which the product was applied manually to the dirt truck entry area surface. The product was applied at a rate of about 13 square feet per gallon and the product penetrated to between five-eights to three-quarters of an inch into the earth. After application of the product and drying, a relatively hard, water repelling surface was formed similar to an asphalt road surface. Prior to application of the product, the entry surface produced substantial dust when vehicles traveled over it. Almost no dust is generated by vehicles traveling over the entry way since treatment with the product and the product has maintained its effectiveness for about five months and remains effective. There have been no noticeable changes in the surface with vehicle travel and several rain storms that have occurred since application of the product, a period of over three months.

EXAMPLE 3

Approximately 8,200 square feet of heavily traveled dirt road approximately 4,120 feet long and 20 feet wide was experimentally treated with the product. The product consisted of 35% Yellow Grease at a temperature upon mixing of 143° F., in 65% water-emulsifier solution at a temperature upon mixing of 65° F. The water-emulsifier solution contained 0.6% by weight of D-L polymer. The water-emulsifier solution was prepared in a holding tank. After hydration of the emulsifier, the heated Yellow Grease was added to the water-emulsion solution. Air was bubbled through the holding tank to help mix the product and the product was recirculated by pumping product from the tank with a centrifugal pump back into the tank. This was done until the product reached emulsion stage. The product was then pumped with a centrifugal pump into a spreader truck tank and was applied by the spreader truck through a spreader spray bar. The product was pumped from the tank to the spray bar by a centrifugal pump running at 1750 RPM. Two passes of the truck over the road were made to cover to 20 foot width with some overlap in the middle of the road. After application and drying of the product, a hard, water impervious surface was formed on the road similar to an asphalt road surface. Prior to application of the product, the road generated substantial quantities of dust from vehicle traffic. After application of the product, substantially no dust is generated. Further, the surface appears to resist wear and no washboarding of the road has occurred. The product has lasted on the road for approximately 3 months without dust generation and has not changed through several rain storms.

EXAMPLE 4

Approximately 29,000 square feet of earth around a plant and carrying vehicular traffic was treated experimentally with 1160 pounds of the product. The product consisted of 35% fatty acid containing material in the form of Yellow Grease at a temperature of 143° F. in 65% water-emulsifier solution at 130° F. The water-emulsified solution contained 0.8% polymer D-L. The Yellow Grease was added to the water-emulsifier solution and mixed similarly to Example 3. After mixing in the holding tank, the product was pumped using a centrifugal pump into a tank on a truck. The temperature of the product was 120° F. The product was pumped from the tank to a spray nozzle and sprayed onto the surface. After drying, the surface was relatively hard and water repellant. The surface has remained substantially the same in over three months of vehicle traffic and several rains.

EXAMPLE 5

A one mile stretch of dirt road, 24 feet wide, was experientially treated with the product. The product consisted of 35% fatty acid containing material in the form of a 50% tallow and 50% Yellow Grease mixture at a temperature of 140° F. in a 65% water-emulsifier solution at 80° F. The water-emulsifier solution contained 0.8% polymer D-L. The fatty acid containing material was added to the water-emulsifier solution and mixed as in Example. The product was then transferred to a spreader truck tank using a centrifugal pump. The product had a mixed temperature of 90° F. in the truck tank. The product was pumped from the truck tank to the truck's spreader bar through which the product was sprayed on the road surface. The product was put down in two applications about thirty minutes apart. After drying, the road surface was hard and water repellant and no dust was generated by vehicle traffic. There has been no noticeable change in the surface in over two months of vehicular traffic of use. The surface has remained smooth without washboarding or rutting.

EXAMPLE 6

An 880 square foot yard with a crushed limestone roadbase surface was treated with 90 gallons of product. The product consisted of 50% Yellow Grease at a temperature of 182° F. and 50% water at 140° F. The water was pumped from a holding barrel by a centrifugal pump as was the Yellow Grease from its holding barrel into the inlet of a third centrifugal pump which served as a mixer for the Yellow Grease and water and pumped the resulting temporary emulsion product through a hose to a hand sprayer from which it was sprayed onto the surface over a fifteen minute period. The roadbase surface has chunks of rock up to the size of large gravel as well as fines therein. The product, upon absorption into the fines and drying bonded the roadbed material together into a hard surface as with the other dirt surfaces treated. The surface has remained hard and water repellant for over two months and does not generate dust.

It should be realized that more or less fatty acid containing material may be needed or can be used depending upon the composition of the fatty acid containing material. The amount of fatty acid containing material used and its composition is not critical except toward the ends of the range given for such material and wide ranges may be used. In addition, the amount of product applied to the surface, i.e., the rate of application, is not critical, but does affect the time needed for the product to be absorbed into the surface and to dry. Where the product is heavily applied it can take several days to be absorbed and dry. In such instance, the surface formed is hard and like an asphalt surface. The more heavily applied, the harder and more durable the surface appears to be. However, it has been found that an application rate of between about 25 to about 40 square feet per gallon creates a satisfactory surface that usually dries in two to four hours. This application rate creates a relative hard and durable surface and is absorbed and dries to the extent that traffic can again travel over the surface in the two to four hours. If applied at a rate of between about ten to fifteen square feet per gallon it takes up to several days to dry. It is much more disruptive to keep traffic off a road for these longer periods, and the surface formed does not appear better to the extent to justify the increased drying time and increased cost for the product.

Because the product creates a relatively hard surface on the earth treated and that relatively hard surface resists wear, it is generally preferred that the surface, particularly if a dirt road, be graded or otherwise smoothed prior to the application of the product. Otherwise, the ruts and washboard areas in the road are preserved with the hard surface formed by the treatment.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

What is claimed is:

1. A method of controlling dust from and erosion of earth surfaces consisting essentially of the steps of mixing water and a fatty acid containing material selected from the group consisting of rendered grease from animals, used vegetable oil, or a mixture thereof to produce at least a temporary semi-emulsion; and applying the at least a temporary semi-emulsion to the earth surface to be absorbed into the surface.

2. A method of controlling dust from or erosion of earth surfaces according to claim 1, wherein the step of mixing the fatty acid containing material and water includes selecting the fatty acid material from the group consisting of yellow grease, tallow, or a mixture thereof.

3. A method of controlling dust from and erosion of earth surfaces according to claim 1, wherein the step of mixing the water and fatty acid containing material includes the selection of amounts of each material to result in the at least temporary semi-emulsion having between about 10% and about 85% fatty acid containing material.

4. A method of controlling dust from and erosion of earth surfaces according to claim 3, wherein the step of mixing the water and fatty acid containing material includes the selection of amounts of each material to result in the at least temporary semi-emulsion having between about 20% and about 50% fatty acid containing material.

5. A method of controlling dust from and erosion of earth surfaces according to claim 3, additionally including the step of mixing an emulsifying agent with the water prior to mixing the water with the fatty acid containing material.

6. A method of controlling dust from and erosion of earth surfaces according to claim 1, additionally including the step of mixing an emulsifying agent with the water prior to mixing the water with the fatty acid containing material.

7. A method of controlling dust from and erosion of earth surfaces comprising the steps of:
   mixing an emulsifying agent with water;
   heating a fatty acid containing material to temperature of between about 130° F. and about 215° F.;
   mixing the water and fatty acid containing material in a manner to produce at least a temporary semi-emulsion and in amounts so that the fatty acid containing material makes up between about 10% and about 85% of the at least a temporary semi-emulsion; and
   applying the at least a temporary semi-emulsion to the earth surface to be absorbed into the surface.

8. A method of controlling dust from and erosion of earth surfaces, comprising the steps of mixing in a manner to produce at least a temporary semi-emulsion, water and a fatty acid containing material wherein the fatty acid containing material has been heated to a temperature of between about 130° F. and about 215° F. prior to mixing; and applying the at least a temporary semi-emulsion to the earth surface to be absorbed into the surface.

9. A method of controlling dust from and erosion of earth surfaces according to claim 8, additionally including the step of mixing an emulsifying agent with the water prior to mixing the water with the fatty acid containing material.

10. A liquid treatment product for earth surfaces to control dust from and erosion of the earth surface to which the product is applied, consisting essentially of:
    a fatty acid containing material selected from the group consisting of rendered grease from animals, used vegetable oil, or a mixture thereof; and
    water;
    wherein the product is in the form of at least a temporary semi-emulsion at the time of application to the earth surface.

11. A liquid treatment product for earth surfaces to control dust from and erosion of the earth surface to which the product is applied according to claim 10, wherein the fatty acid containing material is selected from the group consisting of yellow grease, tallow, or a mixture thereof.

12. A liquid treatment product for earth surfaces to control dust from and erosion of the earth surface to which the product is applied according to claim 10, wherein the fatty acid containing material makes up between about 10% and about 85% of the product.

13. A liquid treatment product for earth surfaces to control dust from and erosion of the earth surface to which the product is applied according to claim 12, wherein the fatty acid containing material makes up between about 20% and about 50% of the product.

14. A liquid treatment product for earth surfaces to control dust from and erosion of the earth surface to which the product is applied according to claim 12, wherein the product additionally includes an emulsifying agent.

15. A liquid treatment product for earth surfaces to control dust from and erosion of the earth surface to which the product is applied according to claim 14, wherein the emulsifying agent makes up to about 1% of the water in the product.

16. A liquid treatment product for earth surfaces to control dust from and erosion of the earth surface to which the product is applied according to claim 10, wherein the product additionally includes an emulsifying agent.

17. A liquid treatment product for earth surfaces to control dust from and erosion of the earth surface to which the product is applied according to claims 16, wherein the emulsifying agent makes up to about 1% of the water in the product.

* * * * *